United States Patent [19]
Shorey

[11] Patent Number: 5,414,792
[45] Date of Patent: May 9, 1995

[54] ELECTRIC THROTTLE AND MOTOR CONTROL CIRCUITRY

[75] Inventor: James L. Shorey, Austin, Tex.

[73] Assignee: DAX Industries, Inc., Houston, Tex.

[21] Appl. No.: 186,971

[22] Filed: Jan. 27, 1994

[51] Int. Cl.$^6$ ............................................. H02P 5/17
[52] U.S. Cl. ................................. 388/811; 388/903; 388/910; 388/930; 388/829
[58] Field of Search .................... 388/809–815, 388/819, 812, 829, 831, 837–838, 903, 907.2, 910, 917–919, 920, 930

[56] References Cited

U.S. PATENT DOCUMENTS

| | | | |
|---|---|---|---|
| 4,673,851 | 6/1987 | Dissen | 388/831 |
| 4,705,997 | 11/1987 | Juzwik | 312/443 X |
| 5,029,229 | 7/1991 | Nelson, III | 388/811 |
| 5,087,865 | 2/1992 | Nelson, III | 388/831 X |
| 5,162,707 | 11/1992 | Joseph | 312/60 |
| 5,179,621 | 1/1993 | Nelson, III | 388/811 |
| 5,220,634 | 6/1993 | Vaguchi et al. | 318/459 X |
| 5,267,344 | 11/1993 | Nelson, III | 388/811 |
| 5,317,669 | 5/1994 | Anderson et al. | 388/829 |

Primary Examiner—William M. Shoop, Jr.
Assistant Examiner—David Martin
Attorney, Agent, or Firm—Gunn, Lee & Miller

[57] ABSTRACT

A solid state, electric motor control circuit is provided in conjunction with a solid state throttle and vehicle sensor circuit that together incorporate; a Hall Effect throttle position sensor circuit, a throttle position signal amplifier circuit, a vehicle reverse condition circuit, a vehicle operation inhibit circuit, a pulse width modulation circuit, and inverting MOSFET driver circuit, a plurality of power MOSFET devices, a voltage regulator circuit, and a current delivery circuit associated with an external DC electric motor. These circuit elements combine to translate a mechanical throttle position into a voltage level signal that can be converted by pulse width modulation circuitry into a pulsed wave form signal that suitably drives a bank of MOSFET, solid state switches so as to control the flow of current through a DC electric motor. The circuit isolates the DC power source from the power drain components in the circuit and communicates vehicle conditions, such as reverse/forward direction and on/off operation, from the vehicle itself to the power controller circuitry. The circuitry incorporates internal elements that raise reliability while still providing versatility in application. Although the present circuitry involves voltage regulation components, it also utilizes current limiting elements as well as over-voltage protection and significant levels of signal filtering.

4 Claims, 2 Drawing Sheets

ELECTRIC THROTTLE AND MOTOR CONTROL CIRCUITRY

BACKGROUND OF THE INVENTION

1. Field of the Invention

This invention relates generally to electric motor control circuits and electric throttle sensor circuits. This invention relates more specifically to the control of a direct current electric motor whose speed is determined by the position of a manually operated throttle, wherein less than full discharge of a direct current power source through the motor is required. Most frequently this invention will find application in controlling of electric motors associated with battery powered vehicles.

2. Description of the Related Art

Efforts to get away from fossil fuel propelled engines and motors have lead to increased usage of electrically propelled engines and motors, especially as they might apply in manned or unmanned vehicles. One of the most significant problems associated with the widespread use of such electrical vehicles and devices is the necessity of maintaining an ample direct current electric power supply in direct association with the electric motor. New battery technologies have reduced the size and weight of direct current power storage devices, but have not altogether addressed the problems of frequent charging and recharging of the batteries for continued use. Efficient use of the stored power in such vehicles is therefore of great concern.

While efficiency in the use of fossil fuel driven engines is primarily a matter of capturing as much of the combustion energy output as possible, efficiency in the use of electrically driven motors primarily concerns regulating the power drain from a direct current power source in a manner that utilizes only such power as is required by the engine for the speed selected in the particular vehicle or application.

In the past, electric motor controller circuits have been designed to tap the direct current power source for a maximum flow of current based upon the highest expected electric motor speed that might be required and to simply channel a portion of the current off through some other current drain when the electric drive motor does not require such high levels of current. In most cases this channeling off of the excess, unneeded current or voltage potential resulted in the waste of such power and a resultant decrease in the efficient use of the power source. More often than not, this method of regulating current flow to the electric motor had a direct effect on the frequency of recharge for the direct current power source.

These earlier types of electric motor controllers typically utilized groups of resistive circuits to provide alternate current drains on the battery or direct current power source. These resistive circuits could be placed in parallel or in series with the electric motor and switched in and out depending upon the current requirements of the motor. It is well known, however, that such resistive circuits continue to drain significant current from a battery and to dissipate such energy in the form of heat. Such approaches, therefore, do not do much for the efficiency of the motor or the vehicle it propels.

Efforts have been made in the past to regulate current flow from a direct current power source through an electric motor in a manner that does not simply channel the current into another current drain. Such efforts have focused on the use of solid state switching devices to pulse the current through an electric motor in a manner that effectively opens and closes a circuit between the direct current power source and the direct current drain (the electric motor) at a specific frequency and with pulse durations related to the desired speed of the motor. The greater the speed, the longer the duration of the current pulses in which the current flow through the motor is in a full on condition. The lower the desired speed, the longer the current pulses in which the flow of current is in an off condition. The current through the motor is always either in a full on condition or a full off condition with the ratio of on duration to off duration determining motor speed. Use of such solid state devices as silicone control rectifiers (SCRs) and metal oxide semiconductor field effect transistors (MOSFETs) have shown great promise in these applications.

Such circuits that utilize SCR and MOSFET devices, however, are only as efficient as their ability to translate some throttle indication of a desired motor speed to an appropriate current flow. This efficiency includes the ability to instill circuit reliability and overall motor and vehicle safety while achieving a longer recharge cycle. Past attempts to utilize such solid state circuit devices as SCRs and MOSFETs have not only suffered from reliability and ruggedness problems, but have also suffered from a complexity and expense not merited by the motors and devices that are intended to be controlled by the circuits. In other words, past attempts to accomplish the regulated control of current through a DC electric motor have succeeded, but only at the expense of unusual complexity and the associated lack of reliability and versatility that often accompanies such complexities.

Solid state current switching devices in applications of concern here, are typically controlled (gated) by a square wave signal having variant pulse widths. This gating square wave is typically generated by a pulse width modulator that translates a given voltage level into a related pulse width in the square wave signal. The voltage level itself, and therefore the pulse width of the square wave, is designed to be representative of a throttle or controller position for the motor or motor driven vehicle.

While basic pulse width modulation technology, as is briefly described above, may be well known in the field of controlling DC electric motors, very little has been done to instill this technology with circuit designs that provide the efficiency, features, functions, and characteristics desired by industries that utilize such DC motors. Many of these desired features and functions of such circuits have been identified in the industry, and to some extent have been addressed, but primarily only in association with other types of engines and propulsion systems. Means for controlling vehicle direction, modifying vehicle speed when direction changes, terminating motion of a vehicle under certain adverse safety conditions, and generally making the controller/propulsion system better able to withstand motion and temperature extremes, have all been addressed in association with internal combustion engines and the like. Unfortunately, the systems addressing these functions that are utilized in internal combustion engines do not translate easily into similar systems that utilize DC electric motors for propulsion. Because of the fundamental differences between internal combustion engines and electric motors, very few of the controller systems associated with the former can be implemented with the latter.

It would therefore be advantageous to have a motor/vehicle controller/throttle circuit that achieves not only the efficient operation of a DC electric motor, but additionally accomplishes the ancillary functions associated with such motors and vehicles and provides a reliable and rugged device that can implement safety features well known in the field of use for a particular vehicle or motor.

SUMMARY OF THE INVENTION

It is, therefore, an object of this invention to provide a reliable and efficient means of regulating the discharge of a DC energy source, such as a battery, through a DC energy transducer, such as an electric motor. A further and related object of this invention is to provide a reliable and efficient means of regulating the speed/torque of a DC electric motor and/or the speed/acceleration of a vehicle powered by such a motor.

It is another object of the present invention to provide a means of regulating the speed of an electric motor by drawing from a DC power source only such current as is required by the motor and eliminating much of the substantial loss of DC power through resistive heat dissipation.

It is another object of the present invention to provide electric motor controller circuitry that incorporates solid state MOSFET devices to achieve the above stated objectives without the necessity of overly complex ancillary circuitry or expensive circuit components.

it is another object of the present invention to provide electric motor controller circuitry that is highly integrated and, therefore, reliable and to a great extent immune from many of the environmental degenerating factors often associated with less sophisticated integrated circuits.

It is another object of the present invention to provide an improved throttle circuit design to work in conjunction with the motor controller circuitry, that is capable of translating the motion of a mechanical, manipulable throttle into an electronic signal capable of being utilized by the motor controller circuitry.

It is another object of the present invention to provide circuit elements that translate power and motion conditions in a vehicle that might be propelled by the controlled electric motor, into safety control points within the motor controller circuitry that initiate speed modification, and power inhibition actions as required, within the circuitry.

It is another object of the present invention to provide circuitry that isolates the direct current power source from all power drain significant destinations in the circuit or in the vehicle, under conditions where an electric motor and/or vehicle are placed in an "off" condition.

It is another object of the present invention to provide electric motor controller circuitry and throttle position sensor circuitry that can be used together to provide a complete translation of throttle position into DC electric motor control.

It is another object of the present invention to provide electric motor controller circuitry and throttle position circuitry that arc versatile in their adaptability to a number of vehicular requirements and DC motor configurations.

It is a further object of the present invention to provide electric motor controller circuitry and throttle position circuitry that arc highly immune to voltage irregularities and temperature and motion extremes within the circuitry.

In fulfillment of these and other objects, the present invention provides a solid state, electric motor control circuit in conjunction with a solid state throttle and vehicle sensor circuit that together incorporate; a Hall Effect throttle position sensor circuit, a throttle position signal amplifier circuit, a vehicle reverse condition circuit, a vehicle operation inhibit circuit, a pulse width modulation circuit, and inverting MOSFET driver circuit, a plurality of power MOSFET devices, a voltage regulator circuit, and a current delivery circuit associated with an external DC electric motor. These circuit elements combine to translate a mechanical throttle position into a voltage level signal that can be converted by pulse width modulation circuitry into a pulsed wave form signal that suitably drives a bank of MOSFET, solid state switches so as to control the flow of current through a DC electric motor. The circuit utilizes a plurality of parallel MOSFET devices whose gates are regulated by the pulse width modulated signal and which share the load of the external DC motor. The circuit isolates the DC power source from the power drain components in the circuit and communicates vehicle conditions, such as reverse and forward direction and on or off operation, from the vehicle itself to the power controller circuitry. The circuitry incorporates internal elements that raise the reliability of the overall circuit while still providing versatility in application. While the present circuitry involves voltage regulation components, it also involves under-voltage as well as over-voltage protection and significant levels of signal filtering.

Other objects and advantages over the prior art will be apparent to those skilled in the art upon a reading of the detailed description that follows together with the drawings described below.

DESCRIPTION OF THE PREFERRED EMBODIMENTS

Figure 1:
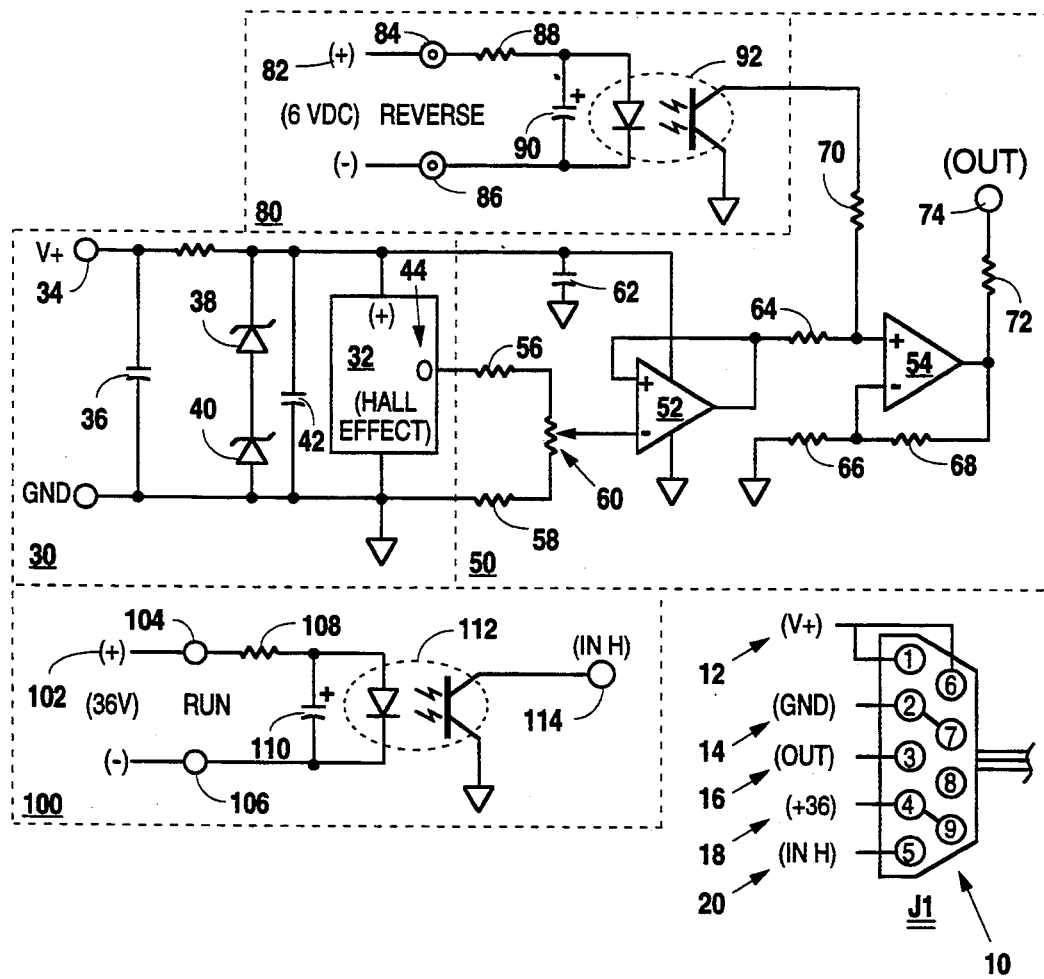
FIG. 1 is a schematic circuit diagram of the preferred embodiment of the throttle/vehicle sensor elements of the circuitry of the present invention.
Figure 2:
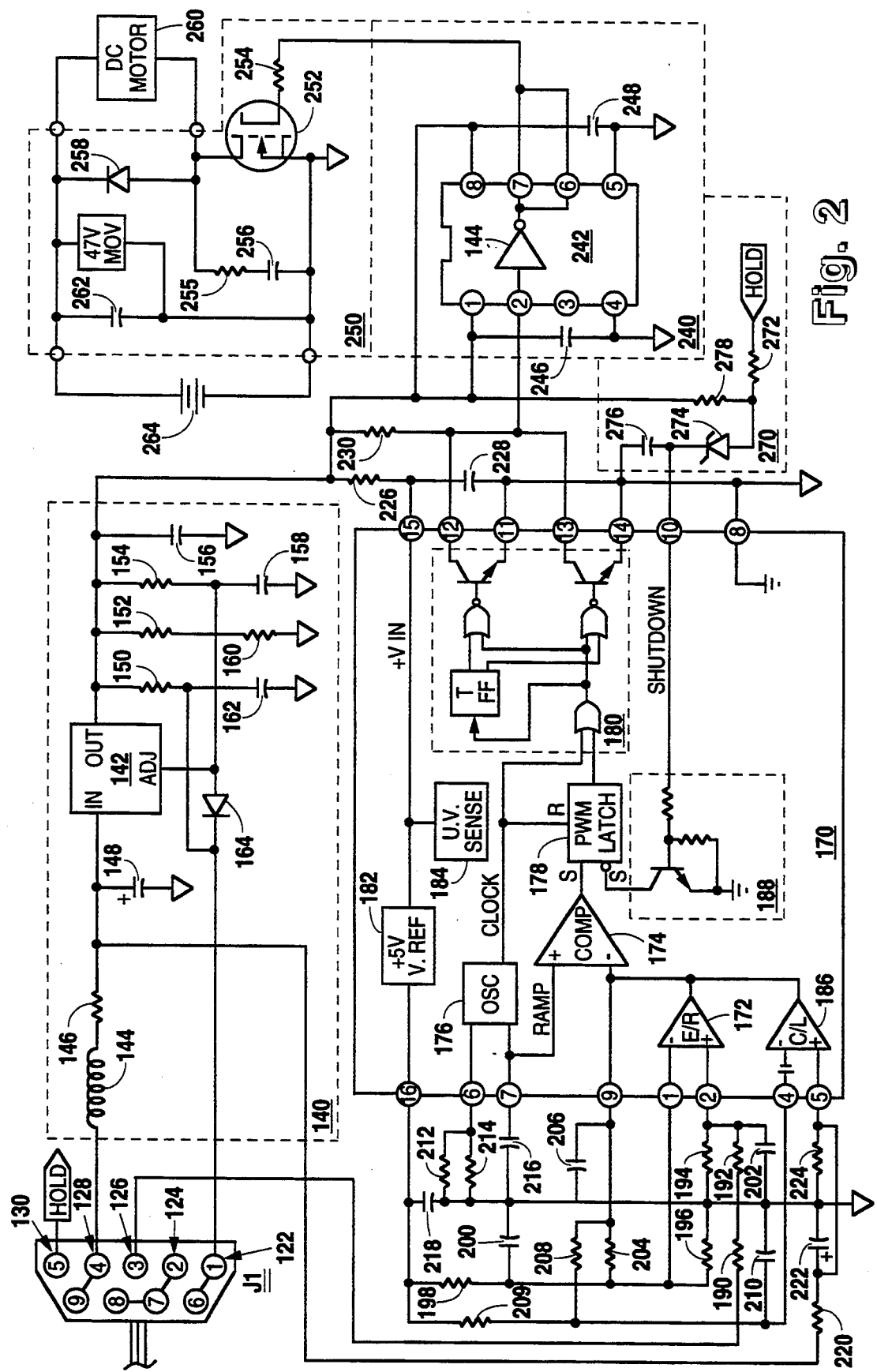
FIG. 2 is a schematic circuit diagram of the preferred embodiment of the motor controller elements of the circuitry of the present invention.

Reference will first be made to FIGS. 1 and 2 for a general description of circuit elements and their functional relations as well as the general connection between the circuits as described. Following this general description, a more detailed description of the individual components that make up the circuits in FIGS. 1 and 2 will be presented.

Reference is first made, therefore, to FIG. 1 for a description of those circuit elements of the present invention that translate throttle and vehicle conditions into electric signals capable of utilization by the balance of the motor controller circuitry. The circuitry described in FIG. 1 is connected to the circuitry in FIG.

2 by way of throttle connector (10) which, in association with the throttle/vehicle sensor circuit in FIG. 1, terminates in a nine pin female plug-type connector. Connections to various circuit elements in the throttle/vehicle sensor circuit shown in FIG. 1 will be described in more detail below.

Figure 1A:
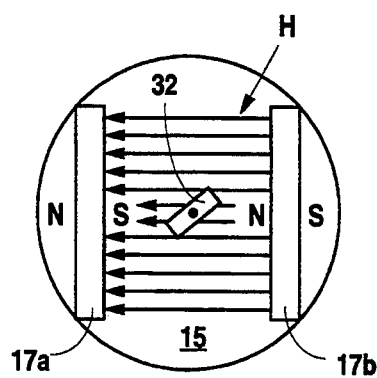
FIG. 1a is a diagram of the functional elements of the throttle linkage for the present invention.

The primary circuit element in FIG. 1 is Hall Effect transducer circuit (30), which translates the mechanical, rotational position of a manipulable throttle into a voltage capable of use by the balance of the circuitry. FIG. 1a shows the mechanical linkage (15) for the throttle (not shown) is connected to magnets (17a and 17b) which produce a rotatable magnetic field (H). The core of Hall Effect transducer circuit (30) is Hall Effect transducer (32). Hall Effect transducer (32) is positioned within magnetic field (H) such that as field (11) rotates in response to a rotation of mechanical linkage (15), Hall Effect transducer (32) senses the field's angular displacement.

The output signal from Hall Effect transducer circuit (30) is handled by Hall Effect amplifier circuit (50) and is calibrated, amplified and filtered to a condition presentable to the motor controller circuitry described in connection with FIG. 2 below. Ancillary to Hall Effect transducer circuit (30) and Hall Effect amplifier circuit (50) are reverse condition circuit (80) and inhibitor condition circuit (100). Reverse condition circuit (80) translates the shifting of a vehicle associated with the present circuitry into a reverse condition, which typically demands certain modifications of vehicle speed and/or a range of speed. Vehicle inhibitor circuit (100) senses and translates a variety of other vehicle conditions such as safety interlocks that might dictate complete termination of power to the DC motor. Reverse sensor circuit (80) modifies the signal output by Hall Effect amplifier circuit (50), while inhibitor circuit (100) simply provides an output signal to be communicated to components in the motor controller circuitry of FIG. 2. Overall, therefore, the circuitry described in FIG. 1 conveys, by way of throttle interface connector (10), a voltage signal intended to allow the motor controller circuitry to direct the flow of current through an electric motor in direct relationship to the position and/or condition of various manipulable devices (throttles and switches) on the vehicle being controlled. In addition to generating this voltage signal controlling the DC motor, the circuitry of FIG. 1 receives a circuit operating voltage, maintains a common ground, conveys the DC power source control voltage, and conveys the inhibit signal generated by inhibitor circuit (100). The specific connections and the sources and destinations of these signals sent through throttle connector (10) will be described in more detail below.

Reference is now made to FIG. 2 for a general description of the circuit elements and their functional relationship in the actual control the DC electric motor. The motor controller circuitry in FIG. 2 also incorporates a connector similar to and compatible with throttle connector (10) described in FIG. 1. Input connector (120) in FIG. 2 is also a nine pin connector, typically of a male configuration, that is matched with the configuration of throttle connector (10). The variable voltage signal output by Hall Effect amplifier circuit (50) in FIG. 1 is provided to pulse width modulation circuit (170) after certain voltage biasing and filtering is provided. Pulse width modulation circuit (170) is an integrated circuit with a variety of internal components that achieve the translation of a voltage level into an output square wave (pulsed width wave) whose pulse widths are related to the voltage level received. Because the circuitry of the present invention initially generates a pulse wave form whose duration of "on" condition is inversely related to the desired motor speed, the output of pulse width modulation circuit (170) must pass through invertor circuit (240) prior to being utilized to control the MOSFETs in MOSFET circuit (250). Once this pulsed wave form has been inverted, however, it drives the gate of a plurality of MOSFETs within MOSFET circuit (250) and thereby controls the flow of current through DC motor (260). Current is provided to MOSFET circuit (250), and thereby to DC motor (260), from DC power supply (264).

Ancillary to the primary circuit chain described immediately above, is voltage regulator circuit (140), which provides not only the circuit operating voltage for the circuit elements in FIG. 2, but also provides such operating voltage back through input connector (120) and throttle interface connector (10) to the circuit elements described in FIG. 1. In addition to the signal conditioning elements that prepare the voltage signal received from the throttle/vehicle sensor circuitry in FIG. 1 for utilization by pulse width modulation circuit (170), there are a number of additional components comprising inhibit circuit (270) that are attached to and function in conjunction with pulse width modulation circuit (170).

It is to be noted that the power source for the operation of the circuit described in FIG. 2, received by way of voltage regulator circuit (140) is not directly received from DC power supply (264). Although power supply (264) is shown in FIG. 2 to be in direct connection with MOSFET circuit (250) and, therefore, DC motor (260), the balance of the circuitry and, therefore, the balance of the operation of the overall system is not connected directly to DC power source (264), only indirectly by way of connectors (10) and (120) and through inhibitor circuitry (100) by way of an external connection, typically an ignition switch or the like.

Overall, these circuit elements described in FIGS. 1 and 2 translate throttle position and vehicle conditions from the vehicle being controlled by the DC motor to the controller circuitry itself in a manner that incorporates important ancillary features and critical motor speed control reliability into the operation of the motor.

Reference is now made again to FIG. 1 for a more detailed description of the individual circuit components that make up the earlier described circuit elements. In the following description of a preferred embodiment, many of the components will be identified by specific integrated circuits and/or specific resistor, capacitor, diode, or voltage values. It is understood by those skilled in the art that many of these specific integrated circuits and many of the specific values of the individual components are presented for example only and could be easily modified given different external conditions or demands on the circuitry or given modifications of the tolerances and accuracy or efficiency of the present circuitry.

Referring again to FIG. 1, throttle connector (10) contains nine pins, which in the preferred embodiment are laid out as follows: pins 1 and 6 of throttle connector (10) are designated and arranged to convey circuit voltage (12), typically +12 volts DC, in this case from voltage regulator circuit (140), described in regard to FIG. 2, pins 2, 7, and 8 are designated and arranged to convey a common ground connection (14) between the circuit elements herein described, pin 3 is designated and arranged to convey control voltage signal (16) from the circuitry of FIG. 1 to the circuitry of FIG. 2, pins 4 and 9 are designated and arranged to convey DC power supply (battery voltage) (18) from the circuitry of FIG. 1 to the circuitry of FIG. 2, and finally, pin 5 is designated and arranged to convey inhibit signal (20) from inhibitor circuit (100) to the appropriate location within the circuitry described in FIG. 2. The connections between throttle connector (10) and the various circuit elements shown in FIG. 1 are identified in the Figure and are described in more detail in association with these various circuit elements below.

Hall Effect transducer circuit (30) is primarily composed of Hall Effect transducer (32), which in the preferred embodiment is a Micro Switch 91SS12-2 type Hall Effect transducer. This transducer (32) works in conjunction with permanent magnets (17a and 17b) in FIG. 1a, attached to mechanical/manipulable throttle linkage (15) and accurately determines the rotational magnetic field in a manner that allows sensor (32) to track the position of the throttle itself. Such a transducer (32) translates the magnetic field changes association with the motion of permanent magnets (17a and 17b) into a voltage level that, when appropriately calibrated, accurately tracks, and can be directly associated with, the position of the throttle.

Hall Effect transducer (32) is driven by circuit voltage (+12 volts DC) at circuit voltage connection (34). This circuit voltage at connection (34) is received by way of circuit voltage connection (12) at throttle connector (10). Filtering capacitor (36) (0.1 microfarad in the preferred embodiment) provides appropriate filtering of this circuit voltage. Blocking zener diodes (38) and (40) (both 5 volt in the preferred embodiment) provide appropriate protection for Hall Effect device (32). Filtering capacitor (42) (10 microfarad) provides additional conditioning of the circuit voltage for the functioning Hall Effect transducer (32). Hall Effect transducer output (44) is the output connection of integrated circuit 91SS12-2 and provides a voltage, which, based upon the specifications and calibration of the integrated circuit, can be directly associated with the rotational or translational motion of the permanent magnet utilized in conjunction with Hall Effect transducer (32). This output voltage at Hall Effect transducer output (44) is, again per specifications, typically within the range of +2.7 to +9 volts DC.

In order to lend versatility and accuracy to the circuity of the present invention, the output of Hall Effect transducer circuit (30) must be amplified and modified so as to fall within the range appropriate for utilization by the motor controller circuit described in FIG. 2. This is achieved by Hall Effect amplifier circuit (50), primarily through first stage operational amplifier (52) and second stage operational amplifier (54). The signal received from transducer output(44) is initially modified by way of bias resistor (56)(1.00K) and bias resistor to ground (58) (1.00K). Versatility, accuracy, and calibration of the circuitry is provided by way of variable resistor (60) (2.00K). An appropriate signal voltage is, therefore, buffered by first stage operational amplifier (OP AMP) (52) which is one half of a National Semiconductor LM358 integrated circuit in the preferred embodiment. The output of op amp (52), with appropriate feedback configuration provided by way of resistor (64) (20.0K), is provided to second stage op amp (54) which is a second half of an LM358 integrated circuit.

Appropriate biasing of second state op amp (54) is provided by way of resistor to ground (66) (20.0K) and feedback resistor (68) (20.0K). Modification of the signal provided to second stage op amp (54) is received from reverse sensor circuit (80) and is described in more detail below. The output of second stage op amp (54) is then provided to variable voltage output connection (74) by way of output resistor (72) (100 ohm) and thereby to throttle connector (10) at connection (16) described above.

As indicated earlier, the voltage signal within Hall Effect amplifier circuit (50) is modified by reverse sensor circuit (80) under certain conditions. It is not unusual in many application of the present circuitry to desire to limit the speed of a vehicle (and therefore the speed of the electric motor controlling the vehicle) to some reduced level when the vehicle is in a reverse configuration. Reverse sensor circuit (80) is designed to provide this modification of a maximum speed, automatically upon shifting of the vehicle into a reverse condition. This is accomplished by simply connecting and reverse sensor circuit (80), by way of reverse indicator connectors (84) and (86) to reverse indicator voltage (82) which is +6 volt DC in the preferred embodiment, but which can be any voltage associated with indications of a reverse condition on the vehicle. In a reverse condition, this +6 volt connection is conveyed by way of resistor (88) (2.2K in the preferred embodiment), is filtered by capacitor (90) (1 microfarad), and drives optical coupler (92) into a conducting condition. A conducting condition in optical coupler (92) pulls bias resistor (70) in amplifier circuit (50) to ground and thereby reducing the voltage level seen by op amp(54) in amplifier circuit (50). Bias resistor (70) in the preferred embodiment is a 56K, 5 percent resistor.

Also associated with the circuitry described in FIG. 1 and connected to throttle connector (10) is inhibitor circuit (100). Operating much in the same fashion as reverse sensor circuit (80), inhibitor circuit (100) is designed to provide a means for completely switching off DC motor current when certain unsafe conditions are present in the vehicle. These unsafe condition switches are often referred to as "dead man" switches or the like and provide a means for automatically terminating the operation of the vehicle and motor when certain manipulable conditions within the vehicle arc, or are not, being met. Such switches are typically hand held controls that when released indicate an adverse safety condition or are operator seat switches that are tripped when the operator leaves the vehicle. In any event, inhibitor circuit (100) is driven by DC power source voltage (102) (+36 volts DC in the preferred embodiment). This DC power voltage (102) is provided to inhibitor circuit (100) by way of inhibitor connectors (104) and (106). Resistor (108) (15K) and capacitor (110) (1 microfarad) condition this voltage for driving optical coupler (112). When optical coupler (112) is conducting; i.e., when the controller circuitry is enabled, inhibit signal output connection (114) is pulled to ground. This ground condition is conveyed from inhibit signal output connection (114) to connection (120) on throttle connector (10). Typically this is an indication that an ignition switch interlock is closed and the system or vehicle is functional.

Reference is now made to FIG. 2 for a more detailed description of the motor controller elements and voltage regulator elements of the circuitry of the present invention. Matching throttle connector (10) in FIG. 1, input connector (120) in FIG. 2 provides a mirror image of the arrangement and assignment of pins for appropriate communication of voltages and signals between the circuits. Input connector (120) incorporates circuit voltage output (122), which provides the approximate +12 volts DC (less voltage drops through resistor (150)) to the circuit elements in FIG. 1, ground connection (124) likewise communicates a common ground between the two circuits, control voltage input connection (126) receives the variable voltage output from Hall Effect amplifier circuit (50) and conveys it to the appropriate circuitry in FIG. 2, DC power supply voltage input (128) receives and conveys battery voltage to voltage regulator circuit (140), and finally, inhibit signal input (130) conveys the ground condition described above (when present) for inhibitor circuit (100) to the appropriate place in the circuitry described in FIG. 2. It should be noted that in the event that the connection between connectors (10 and 120) is broken or removed, input (130) will go high and inhibit the circuitry.

Reference is now made within FIG. 2 to voltage regulator circuit (140) and a detailed description of the elements that it comprises. The core of voltage regulator circuit (140) is regulator integrated circuit (142), which in the preferred embodiment is an LM317 integrated circuit. Input voltage to regulator IC (142) is provided by way of noise suppression inductor (144) (0.15 micro HY) and resistor (146) (10 ohm, 3 watt). The input voltage is further filtered by capacitor (148) (10 microfarad, 50 volt). The output of voltage regulator (142) provides a +12 volts DC to a number of circuit elements of the present invention, including elements described in FIG. 1. By way of output resistor (150) (47 ohm), a voltage is provided back through connector (120) and connector (10) to the circuit elements described in FIG. 1. Filtering for this output voltage provided by capacitor (162) (0.22 microfarad). A voltage is provided by way of resistor (152) (232 ohms), held up by resistor (160) (2.0K) to provide the appropriate voltage at the adjustment input of regulator IC 142 and to also appropriately configure the output circuit voltage by way of short circuit protection diode (164) (1N914 in the preferred embodiment). These output voltages arc appropriately filtered by capacitors (156) (10 microfarad), (158) (15 nanofarad), and (162) (0.22 microfarad). The output of voltage regulator circuit (140) is provided not only back to certain elements in FIG. 1, but to the necessary circuit elements in FIG. 2, as described in more detail below.

The primary component of the circuitry described in FIG. 2 is pulse width modulation circuit (170). In the preferred embodiment, this PWM circuit is an integrated component typified by a UC2524-A chip, manufactured by Unitrode Corporation. The specifications for this integrated circuit, as well as various applications, arc well known in the art and arc published in association with the integrated circuit and arc incorporated herein by reference.

The internal circuit elements of PWM circuit (170) that arc of concern in the present application include signal amplifier op amp (172), comparator (174), oscillator (176), PWM latch (178), PWM output circuit (180), +5 volt DC voltage reference (182), under voltage sensor (184), current limiter op amp (186), and inhibit shutdown switch circuit (188). Signal amplifier op amp (172) receives the variable voltage signal from the throttle/vehicle sensor circuit by way of connection (126) on connector (120). Through resistors (190 and 192) (which total 69.9 K in the preferred embodiment and which may be replaced by a single resistor), this signal voltage is biased by resistor (194) (100 K) tied to ground. Appropriate biasing for amplifier (172) is also provided by way of resistor (196) (200K) to ground. Filtering for the input voltage signal is provided by way of capacitor (202) (330 picofarad). The output of amplifier (172) is conveyed to the appropriate input of comparator (174) and is fed back to amplifier (172) by way of resistor (204) (69.1K) biased by resistor (208) (49.9K). The feedback loop is filtered by capacitor (206) (0.1 microfarad). Biasing provided by resistor (208) is assisted by pull up resistor (209) (49.9K) which is connected to a reference +5 volt DC. This reference voltage is filtered by capacitor (210) to ground (330 picofarad). The other input of comparator (174) is received from oscillator (176) which provides a sawtooth wave of a specific frequency in order to effect the pulse width modulation of the variable voltage signal output by amplifier (172). Oscillator (176) is configured by way of external components, resistor (212) (150K), resistor (214) (21.5K), capacitor (216) to ground (3.3 nanofarad), and capacitor (218) (0.22 microfarad). The combination of resistors (212 and 214) and capacitor (216) determine the oscillator frequency (20 kHz±2% in the preferred embodiment). Capacitor (218) provides noise filtering for the +5 volts DC reference voltage. Resistor (212) is used to fine tune the oscillator frequency.

To complete the external components utilized to modify and control the operation of PWM IC (170), current limiter op amp (186) is configured with current limiter resistor (220) (270K), filtering capacitor (222) to ground (10 microfarad), bias resistor (224) (49.9K), and parallels its output with amplifier (172) into comparator (174). The operation of the current limiting feature of the present invention will be described in more detail below.

Operating voltage to IC (170) is provided from voltage regulator circuit (140) by way of +V supply resistor (226) (10 ohm). This supply voltage is filtered by way of filtering capacitor (226) to ground (0.68 microfarad). Pull up resistor (230) (1K) is positioned appropriately with the output of PWM IC (170). PWC IC (170), as configured, senses low battery/DC power source (264) conditions due to either large current or low battery charge conditions. In any case, power output is gradually limited to zero by PWC IC (170) as battery voltage falls below 28 volts DC. The combination of resistor (220) and capacitor (222) also provide a 0.5 second turn on time when power is applied to the unit.

Comparator (174) compares the sawtooth wave generated by oscillator (176) with the variable voltage generated by amplifier (172) and produces a pulse width modulated square wave signal to PWM latch (178) and from there through PWM output circuit (180). The configuration of PWM output circuit 180 in FIG. 2 shows an arguably redundant use of the standard internal components of the IC described in the preferred embodiment. Parallel outputs are combined to create a single pulse width modulated signal to the balance of the circuitry. PWM latch (178) simply controls the operation and output of comparator (174) and prevents the uncontrolled cycling of the output signal. The function of PWM latch (178) can be modified by inhibit shutdown switch (188), a feature also utilizing internal circuitry in the IC of the preferred embodiment so as to terminate the output signal from PWM IC (170) when required.

As indicated above, parallel outputs from PWM circuitry (170) are combined external to the IC and are provided to invertor circuit (240). As described earlier, the output of PWM circuit (170) is actually inversely related to the MOSFET gate voltages required for the desired current flow in the DC motor. This square wave output, therefore, must be inverted prior to utilization by the MOSFET circuits which control the current to the motor. This square wave conversion is provided through invertor circuit (240) by way of invertor amplifier (242) (part of a Teledyne TSC4429 IC in the preferred embodiment). IC (242) contains one op amp (244) in inverting configuration to provide an output to MOSFET circuit(s) (250). Amplifier IC (242) receives operating voltage from voltage regulator circuit (140) and has the operating input filtered by way of capacitors (246) and (248) (0.68 microfarad and 2.2 microfarad respectively in the preferred embodiment). The inverted output from invertor circuit (240) is provided in parallel to a plurality of MOSFET devices generically described by MOSFET circuit (250). MOSFET circuit (250) shows a single power MOSFET device (252), although it is understood that a plurality of such devices (252 and 254) [15 such groups in the preferred embodiment] might be placed in parallel to handle the required current flow through DC motor (260). Power MOSFET gate (252) is gate driven by invertor circuit (240) through gate resistor (254) (47 ohm). The damping of MOSFET device (252) is controlled by MOSFET resistor (255) (10 ohm, 5 watt) and MOSFET capacitor (256) (0.1 microfarad). Reverse induced current flow through DC motor (260) is shunted by flyback diode (or diodes) (258). Reverse induced energy is stored by way of capacitor (262) (10,000 microfarad in the preferred embodiment, +36 volts to ground) as well as in the battery (264) and, as indicated above, forward current to the motor by a direct connection through the MOSFET network (252) from DC power supply (264) (+36 volt battery) to DC motor (260) is arranged.

Ancillary to the above described circuitry in FIG. 2 are a number of additional circuit components that convey and the inhibit signal described above to the appropriate shutdown circuit (188) within pulse width modulation IC (170). Inhibit circuit (270) contains inhibit signal resistor (272) (3.9K) and biasing zener diode (274) (5.0 volts). Inhibit filtering capacitor (276) (1.0 nanofarad) and inhibit signal pull up resistor (278) (6.8K) complete inhibit circuit (270). PWM IC (170) becomes inhibited when the voltage at connection (130) becomes greater than or equal to +6 volts DC. An open circuit condition at connection (130) forces this shutdown condition. In addition, with connection (130) held low (i.e., PWM IC (170) enabled) an internal fault condition forcing the output of voltage regulator (142) greater than +16 volts DC will shutdown the PWM IC (170) (and thus the motor) providing a limited degree of protection.

While a preferred embodiment has been shown and described, it will be understood that it is not intended to limit the disclosure, but rather it is intended to cover all modifications and alternate methods falling within the spirit and scope of the invention as defined in the independent claims or their equivalents.

We claim:

1. A motor control circuit that provides efficient control over a direct current electric motor by translating the mechanical position of a manipulable throttle into a current flow from a direct current power source, comprising:

a Hall Effect throttle position transducer;
   a throttle signal amplifier circuit for amplifying and conditioning a
   throttle signal from said Hall Effect transducer;
   a reverse condition sensor for modifying said throttle signal in response to a reverse condition in a vehicle propelled by said electric motor;
   a voltage regulator circuit;
   a pulse width modulation (PWM) circuit for generating a first square waveform wherein the duration of each square wave pulse is inversely related to a voltage level of said throttle signal;
   an inhibitor circuit for sensing an absence of an operational voltage and for canceling said first square waveform upon said absence or upon sensing an over-voltage condition;
   an invertor circuit for inverting said first square waveform and converting it to a second square waveform; and
   at least one MOSFET circuit acting as a current switch to regulate a flow of current through said electric motor, said MOSFET circuit controlled by said second square waveform.

2. A motor control circuit that provides efficient control over a direct current electric motor by translating the mechanical position of a manipulable throttle into an appropriate current flow from a direct current power source, comprising:

a Hall Effect throttle position transducer circuit comprising;
      a. a magnetic component positioned on said throttle, and
      b. a sensor component positioned so as to sense variations in magnetic flux density from said magnetic component and to generate an output voltage whose level is indicative of said magnetic flux density and therefore of a position of said throttle;
   a throttle signal amplifier circuit for receiving, amplifying and filtering said output voltage from said Hall Effect position transducer; a reverse condition sensor circuit comprising;
      a. means for sensing a switch closure resulting from a reversing condition in a vehicle propelled by said electric drive motor,
      b. a voltage modifier circuit connected to said throttle signal amplifier circuit for modifying said output voltage in response to said reversing condition in said vehicle, and
      c. an optical coupler for isolating said means for sensing a reversing condition from said voltage modifier circuit; an inhibitor circuit comprising;
      a. means for sensing the presence of an operational voltage from said direct current power source at an inhibit connection point,
      b. an inhibit signal circuit for providing a power inhibit signal indicative of an absence of said operational voltage at said inhibit connection point to said direct current power source, and
      c. an optical coupler for isolating said means for sensing said operational voltage from said inhibit signal circuit;
   a voltage regulator circuit for receiving said operational voltage and generating a circuit voltage;
   a pulse width modulation (PWM) circuit comprising;

a. a control signal filter and amplifier circuit for the reception and conditioning of said output voltage from said throttle signal amplifier circuit, b. an oscillator circuit for generating a sawtooth waveform having an amplitude that varies across the amplitude range of said output voltage, c. a comparator circuit for comparing said received and conditioned output voltage with said sawtooth waveform and generating a first square waveform wherein the duration of each square wave pulse is inversely related to the level of said output voltage, d. a PWM latching circuit for stabilizing said first square waveform generated by said comparator, and e. an inhibit circuit for canceling said first square waveform upon reception of said inhibit signal from said inhibitor circuit or upon sensing an over-voltage condition in said circuit voltage;

an invertor circuit for receiving said first square waveform and converting it to a second square waveform directly related to said level of said output voltage; and at least one MOSFET circuit, said MOSFET circuit acting as a current switch controlled by said second square waveform, said current being supplied from said direct current power source to said direct current electric motor through said MOSFET circuit.

3. A motor control circuit that provides efficient control over a direct current electric motor powered by a direct current power source, comprising:

a throttle input connector comprising;

a. a terminal for connection to an external control variable voltage circuit, b. a terminal for connection to said direct current power source, c. a terminal for communicating a circuit operating voltage, and d. a terminal for receiving a power inhibit signal;

a voltage regulator circuit for receiving a voltage from said direct current power source and generating said circuit operating voltage;

a pulse width modulation (PWM) circuit comprising;

a. a control signal filter and amplifier circuit for the reception and conditioning of a variable voltage signal from said external control variable voltage circuit, b. an oscillator circuit for generating a sawtooth waveform having an amplitude that varies across the amplitude range of said variable voltage signal, c. a comparator circuit for comparing said received and conditioned variable voltage signal with said sawtooth waveform and generating a first square waveform wherein the duration of each square wave pulse is inversely related to the level of said variable voltage signal, d. a PWM latching circuit for stabilizing said first square waveform generated by said comparator, and c. an inhibit circuit for canceling said first square waveform upon reception of an inhibit signal through said power inhibit connection or upon sensing an over-voltage condition in said circuit operating voltage;

f. a current limit amplifier for limiting duty cycle during (1) power up conditions, and (2) low battery voltage conditions due to low change/excessive motor current;

an invertor circuit for receiving said first square waveform and converting it to a second square waveform directly related to said level of said variable voltage signal; and at least one MOSFET circuit, said MOSFET circuit acting as a current switch controlled by said second square waveform, said current being supplied from said direct current power source to said direct current electric motor through said MOSFET circuit.

4. An throttle/vehicle condition sensor circuit for determining the mechanical position of a manipulable throttle for an electric drive motor and generating a variable voltage indicative of said position of said throttle, comprising:

a control output connector comprising;

a. a terminal for communicating said variable voltage to an external power control circuit, b. a terminal for connecting said direct current power source to said external power control circuit, c. a terminal for receiving a circuit operating voltage, and d. a terminal for communicating a power inhibit signal; a Hall Effect position transducer circuit comprising;

a. a magnetic component positioned on said throttle, and b. a sensor component positioned so as to sense variations in magnetic flux density from said magnetic component and to generate an output voltage whose level is indicative of said magnetic flux density and therefore of a position of said throttle;

an amplifier circuit for receiving said output voltage from said Hall Effect position transducer, amplifying and filtering said output voltage, and communicating said output voltage through said control output connector; a reverse condition sensor circuit comprising;

a. means for responding to a switch closure signaling a reversing condition in a vehicle propelled by said electric drive motor, b. a voltage modifier circuit connected to said amplifier circuit for modifying said output voltage in response to said reversing condition in said vehicle, and c. an optical coupler for isolating said means for sensing a reversing condition from said voltage modifier circuit; and an inhibitor circuit comprising;

a. means for sensing the presence of an operational voltage from said direct current power source at an inhibit connection point, b. an inhibit signal circuit connected to said terminal for communicating said power inhibit signal, said inhibit signal circuit for providing a power inhibit signal indicative of an absence of said operational voltage at said inhibit connection point to said direct current power source, and c. an optical coupler for isolating said means for sensing said operational voltage from said inhibit signal circuit.

* * * * *